United States Patent Office 2,750,323
Patented June 12, 1956

2,750,323

PROCESS FOR PRODUCING SHAPED BODIES

Ernst Schmitz-Hillebrecht and Gerhard Technau, Krefeld, Germany, assignors to Farbenfabriken Bayer Aktiengesellschaft, Leverkusen, Germany, a corporation of Germany No Drawing. Application July 3, 1953,
Serial No. 368,200

10 Claims. (Cl. 154—140)

The present invention relates to a process for producing shaped bodies constructed by gluing porous elements and which are open to attack by biologically destructive agencies such as pests and fungi. The shaped bodies include plates, boards, rods, shells and profile sections of all kinds. The individual elements from which the shaped bodies are constructed may comprise plates, flakes, rods, prisms, cubes, splints or fibres, especially of wood or other vegetable matter such as straw, grass, and the like.

It is known to prepare shaped bodies of all kinds from such materials by mixing them or by coating the surface with bonding materials such as solutions of natural glues, e. g. casein, bone glue, blood albumin, soja glue, starch, gum arabicum, and latex, gelatin or dextrin or with synthetic resin adhesives e. g. urea-aldehyde or phenol-aldehyde or urea-phenol-aldehyde condensation products, casein-formaldehyde condensation products, melamine resins, alkyd resins, polyesters, polyamides, polyvinylchloride, polyvinylacetate, styrene, mixed vinyl polymerisation products, phenol-polyvinyl acetate, and polyethylene oxide subsequently forming the mixtures or building-up layers of elements, and bonding, drying or hardening the adhesive substances especially at elevated temperatures and at superatmospheric pressure. Shaped bodies prepared in such a manner are readily open to attack by pests or fungi.

The present invention comprises gluing such bodies and simultaneously impregnating them against parasites, by using glues which contain protective agents in the form of a dispersion and adding to the glue a coagulating (i. e. dispersion breaking) displacing agent.

Suitable adhesives for the above process include the above mentioned substances commonly used for such purposes in industry.

Suitable protective agents which may be dispersed according to the invention in the glue solutions comprise fungicidal media such as chlorinated aromatic hydrocarbons, e. g. chlorinated diphenyl or terphenyl, hexachlorobenzene, pentachloronaphthalene, chlorinated anthracene and acenaphthene, chlorinated aliphatic hydrocarbons e. g. chlorinated white spirit, chlorinated petroleum and chlorinated paraffins with a chain length of about 10–20 carbon atoms and a chlorine content of about 10%–70%, phenols e. g. the phenol, cresols, xylenols, naphthols, o- or p-hydroxydiphenyl, oxyanthracene, oxypyrene, oxychrysene, p-chlorometacresol, pentachlorophenol, chlororesorcin and chlorinated naphthols and finally insecticides such as thiophosphoric acid esters e. g. p-nitrophenyl or p-nitro-o-chlorophenyl thiophosphoric acid diethyl or di-propyl or dibutyl esters as well as dichlorodiphenyl trichloroethane, γ-hexachlorocyclohexane and polychloroindane.

The formation and stability of the dispersion of such agents in glues may sometimes be increased by the addition of an emulsifier or stabilizer. Suitable emulsifiers comprise the addition products of ethylene oxide with compounds containing hydroxyl groups e. g. castor oil or alkyl phenols or the alkali metal salts of alkyl naphthalene sulphonic acids e. g. the sodium salt of di-iso-butyl naphthalene sulphonic acid. Suitable stabilizers comprise for instance methyl cellulose or polyvinyl alcohol.

Compounds which in the new process may also be added to the glue and which have a coagulating effect on the dispersion of the protective agent comprise electrolytes especially those whose solubility in water is strongly dependent on temperature e. g. potassium nitrate. The addition of inorganic and organic compounds which decompose at elevated temperature into gases and which support, by virtue of the gas pressure produced, the penetration of the protective agent into the porous masses e. g. layers of wood comprise for instance ammonium carbonate, ammonium bicarbonate, ammonium nitrite, cyclohexylamine carbonate, guanidine carbonate or aliphatic diazo compounds, e. g. diazo-butyric acid nitrile. Especially effective are organic amines e. g. butylamine, isohexylamine, isoheptylamine, mono-, di- and triethanolamine, triethylamine, tributylamine, mono- or di-ethylaminocyclohexane, aniline, dimethyl aniline, p-amino-dimethyl aniline, inorganic bases e. g. hydrazine hydrate and salts like the compounds of alkyl naphthalene sulphonic acids with organic amines e. g. di-iso-butyl naphthalene sulphonic or disulphonic acid with cyclohexylamine or di-ethylaminocyclohexane and chloronaphthalene sulphonic acid di-ethylamine. For a similar purpose there may be added fillers e. g. crushed stone, highly dispersed silicon dioxide, zinc oxide, iron oxide, and fuller's earth.

In order to obtain effective results in combating parasites it is advisable to add protective agents e. g. chlorinated aliphatic hydrocarbons, chlorinated soft resin-like terphenyl, thiophosphoric esters in quantities corresponding to about 0.5 to 50% of the glue material. The actual quantity used depends upon the fungicidal and pesticidal action of the protective agents. There are preferably used a mixture of several protective agents.

The quantities of the coagulants which are added to the protective glue dispersion may vary within wide limits for instance between about 0.1% and 30% calculated on the total weight of dispersion. It is also desirable to apply several coagulants simultaneously.

The exudation and displacement of the protective agent out of the glue which according to the invention is effected by means of the above mentioned additions and in suitable cases by the application of heat, causes the protective agents to penetrate even through quite thick construction elements.

*Example 1*

In experiment A, 160 grams of a pre-condensate of urea and formaldehyde dissolved in 100 grams of water is mixed with 1.8 grams of an emulsifier, e. g., the sodium salt of di-iso-naphthalene-butyl sulphonic acid. There are then added 0.6 gram of hexahydro-N-diethyl aniline and 90 grams of an oily wood preserving medium which contains:

20% of a soft resin-like chlorinated diphenyl (60% chlorine)
76% chlorinated aliphatic petroleum hydrocarbons with an average carbon chain length of 12 and a chlorine content of about 16%
3.5% pentachlorophenol
0.5% p-N-nitrophenyl thiophosphoric acid diethylester The mixture is well stirred and a dispersion stable for several days at room temperature is thus obtained. Before carrying out the gluing 26 grams of a hardening solution are added whilst stirring, said solution consisting of:

45% urea
8% ammonium chloride
20% water
27% aqueous ammonia

This dispersion is used for producing plywood of 3 layers of 1.5 mm. beech. To the inner sides of the outer layers are applied 270 grams per sq. metre of the dispersion. The layers are pressed together with the central layer for 10 min. at 100° C. at a pressure of about 16 atm.

In experiment B in a similar manner plywood made from beech wood is glued with an urea formaldehyde glue without wood preservative and without addition of an amine.

On small pieces of the experimental preparations A and B as well as on a control piece (C) consisting of non-glued (untreated) wood plies are distributed 25 corn weevils. The experimental results were as follows:

| Paralysis | | Death | |
|---|---|---|---|
| 80% | 100% | 80% | 100% |
| hrs. | hrs. | hrs. | hrs. |
| A, after 10 hrs. 17 | 41 | | 50 |
| B, after 100 hrs. 170 | 137 | 170 | |
| C, after 120 hrs. 185 | 137 | | 190 |

A test of the glue strength according to Leaflet 3 of the Forschungsinstitut für Sperrholz e. V., Berlin, gave the following results:

Experiment A: mean value determined from 10 tear tests, 43.8 kilograms per sq. cm.

Experiment B: mean value determined from 10 tear tests, 41.7 kilograms per sq. cm.

*Example 2*

320 grams of a pre-condensate of urea and formaldehyde dissolved in 210 grams of water are mixed with 3.8 grams of the sodium salt of butyl naphthalene sulphonic acid. To this mixture are added with stirring 180 grams of an oily wood impregnating medium which consists of: 95% chlorinated aliphatic petroleum hydrocarbons having the characteristics described in Example 1 and 5% chlorometacresol. To the dispersion thus prepared are added 1.2 grams of N-dimethylcyclohexylamine and 52 grams of the hardening solution referred to in Example 1. For the manufacture of plywood which consists of three layers of 2 mm. thick Gaboon wood foils are used 290 grams of glue per sq. mm. The foils are then pressed under the conditions referred to in Example 1. A piece of plywood thus prepared contains approximately 23 kilograms per cu. metre of an oily wood preservative and exhibits great resistance to animalic and vegetable parasites.

*Example 3*

To the glue preparation mentioned in Example 2 are added with stirring 190 grams of an oily mixture containing 99% chlorinated test-benzine (40% chlorine) and 1% hexachlorocyclohexane (containing 70% of the γ-isomer compound). To the dispersion thus obtained are added 1.2 grams of 4-aminodimethylaniline. The dispersion is then used to glue three layers of limba wood having a thickness of 0.8 mm. each. 290 grams of the glue dispersion are used per sq. metre. The plywood contains 25 kilograms' oily wood preservatives per cu. metre. By this treatment the central cross section of the plywood including the outer areas is protected against insects.

A test was carried out by placing 10 corn weevils on a small chalk dusted glass ring on the surface of plywood having been treated as described above. 100% death of the insects took place within 48 hours whereas 236 hours were required to bring about the same result when carrying out a comparative test with untreated plywood. Similar experiments with Imagines of *Anobium punctatum* showed death of the test-insects within 24 hours on the treated plywood. Insects, however, placed on plywood treated in the standard manner continued to deposit eggs.

*Example 4*

To the preparation described in Example 1 are added with stirring 95 grams of an oily mixture containing 20% o-di-chlorobenzene, 50% γ-chloronaphthalene and 30% of a petroleum fraction having a boiling point of 192–200° C. at a pressure of 760 mm., and 0.75 gram of isohexylamine. After the addition of 26 grams of the hardening solution having the composition described in Example 1 the three beech layers of 1.5 mm. thickness are treated with this mixture. 290 grams of the dispersion per sq. metre are used. The plywood thus contains about 30 kilograms of an oily preservative per cu. metre. Corn weevils placed on the plywood thus treated soon die.

Experimental pieces of plywood prepared according to DIN 52176 were, in accordance with the prescriptions cited therein, tested with 5 different wood destroying fungi. Only the plywood which had been prepared without the protective treatment and without the addition of an amine was destroyed by the 5 different fungi. When storing such treated plywood in damp atmospheres mould is not formed, whereas a control piece without the treatment described in the present application showed a mould covering.

*Example 5*

80 grams of a pre-condensate of urea and formaldehyde, 50 grams of water and 1 gram of the sodium salt of butyl naphthalene sulphonic acid are mixed with stirring whilst at the same time there is added to the mixture an oily medium which is especially effective against termites, which consists of 69% chlorinated test benzine (40% chlorine) 29% chlorinated petroleum fraction in which the carbon chain contains 10–12 atoms and which has been chlorinated to the extent of 18%, 1% 2-methylanthraquinone and 1% pentachlorophenol. 1.3 grams of diethylaniline are added as coagulant. As hardening agent are added 13 grams of a hardening solution having the composition described in Example 1. After a short stirring a useful dispersion which may be applied with a brush is obtained. A plywood the middle layer of which consists of a 2.4 mm. thick beech layer and the outer layers of which consist of 1.2 mm. thick tropical Bobele wood exhibit after gluing with said dispersion termite resisting properties. The use of 250 grams per sq. metre of glue (with the hardening agent) results in plywood containing about 26 kilograms per cu. metre of oily mixture.

*Example 6*

70 grams of a pre-condensate of a melamine resin, 190 grams of water and 1.2 grams of dimethylcyclohexylamine are thoroughly mixed with 90 grams of an oily wood preserving medium which consists of 79.5% of a chlorinated aliphatic petroleum hydrocarbon in which the chain contains 10–12 carbon atoms and which has been chlorinated to the extent of about 18% and 20% of a mixture of chlorinated diphenyl and terphenyl (approximately 60% chlorine) and 0.5% p-nitrophenyl-thiophosphoric acid diethyl ester. The dispersion thus obtained is used in the manufacture of a table top having the following characteristics: middle layer fir beams 20 x 7 mm.; closing layers 2 mm. thick Gaboon. When 270 grams per sq. metre dispersion is applied the table top will contain 14 kilograms per cu. metre of the oil preservative. The wood thus prepared is resistant to water and, under experimental tropical conditions, is found to be safe from attack by termites of the type *Reticulitermes lucifugus*.

*Example 7*

To 90 grams of a glue preparation consisting of 160 parts by weight of a pre-condensate of urea and formaldehyde glue and 100 parts of water there are added 42 grams of an oily impregnating medium having the following composition:

17% chlorinated terphenyl (35% chlorine)
74.5% chlorinated aliphatic petroleum hydrocarbons, the average chain of each chaining 10–12 carbon atoms and each having a chlorine content of 14%.
0.5% γ-hexachlorocyclohexane
3% α-chloronaphthalene
5% o-diphenyl hydroxide To the impregnating medium thus prepared are added 0.3 grams of dimethylamine cyclohexane. Shortly before carrying out the gluing operation 10 grams of the hardening agent are added with stirring as described in Example 1 and the gluing is carried out under the conditions described in Example 1 as that a cubic metre of plywood contains 20 kilograms of impregnating medium. The plywood is tested by corn weevils. After 60 hours 100% of the weevils are dead.

*Example 8*

To 90 grams of the glue preparation described in Example 7 mixed with 0.85 gram of an emulsifier e. g. the sodium salt of diisobutylnaphthalene sulphonic acid are added 42 grams of an oily impregnating medium as described in Example 1 or 2. A stable dispersion is obtained by thorough stirring. To this dispersion are added prior to gluing 10 grams of a hot hardening solution under the conditions as mentioned in Example 1, and 10 grams of ammonium bicarbonate. By adding to the above impregnating medium an oil-soluble dye and gluing for instance 3 limba layers in such a manner that each cubic metre of the plywood contains 20 kilograms of the impregnating medium, under the conditions described in Example 1, the penetration of the impregnating medium will be recognised by the colouration of the outer faces of the plywood. Calculated on the surface area penetration of the oil impregnating is obtained to the extent of about 70%.

*Example 9*

It is possible to use natural glues, such as casein by adding to them inorganic or organic compounds which decompose into a gas. The glue preparation with the emulsifier is carried out as follows: 50 grams of casein are treated with 300 grams of water and 15 grams of concentrated ammonia. To this preparation are added 15 grams of sodium azide solution (1:10).

In a separate vessel 20 grams of montan wax are treated with 80 grams of water and 20 grams of concentrated ammonia.

The preparations thus prepared are mixed while stirring.

200 grams of the glue preparation thus obtained are reacted as described in Example 1 or 2 with 42 grams of an oily impregnating medium and 10 grams of ammonium bicarbonate. Stirring for a short while ensures a smooth dispersion. Limba foils are then glued in such a manner that 1 cubic metre of the plywood contains 20 kilograms of the above impregnating medium. An oil-soluble dye may be added to the oily impregnating medium. When gluing has been carried out for 30 minutes at 100° C. and at a pressure of 10–12 kilograms per sq. cm. the degree of penetration of the impregnating medium will be recognised by the colouration of the outer faces of the plywood. Calculated on the surface area penetration of the oil impregnating is obtained to the extent of about 60%.

*Example 10*

To a dispersion prepared as in Example 8 are added 5 grams of diazo-butyric acid nitrile instead of the 10 grams of ammonium bicarbonate used therein. There is also added to the oily impregnating medium an oil soluble dye, and the dispersion so obtained is used for gluing three limba layers in such a manner that 1 cubic metre of plywood contains 20 kilograms of impregnating medium. Pressing is carried out however in this case for 10 minutes at 150° C. at a pressure of 12 kilograms per sq. cm. After gluing has been carried out it is again possible to recognise from the colouration of the outer faces of the plywood the penetration of the oily impregnating medium. Calculated on the surface area the penetration is about 70%.

*Example 11*

To the preparation described in Example 7 there are added 25 grams of a filler such as crushed slate or crushed stone. When carrying out the gluing under the conditions described in Example 8 100% killing of corn weevils takes place after 20 hours.

*Example 12*

The 90 grams of the glue preparation described in Example 9 are added, whilst stirring, 40 grams of water, 0.8 gram of the sodium salt of the di-iso-butylnaphthalene sulphonic acid and drop by drop 42 grams of an oily impregnating medium as in Example 7 together with an addition of 0.3 gram of diphenyl aminocyclohexane. To this preparation are then added 20 grams of highly dispersed silicon dioxide and gluing, including the addition of oil-soluble dye is carried out as in Example 8. Calculated on the surface area the penetration amounts to 90%.

*Example 13*

90 grams of the glue preparation as in Example 8 are mixed with stirring with 42 grams of an oily impregnating medium as described in Example 7. To this dispersion thus obtained are added 5 grams of di-iso-butylnaphthalene sulphonic acid dimethylamine cyclohexane. Gluing, including the addition of an oil-soluble dye, is carried out in the manner described in Example 8. Penetration of the impregnating medium calculated on the surface area amounts to 98%.

*Example 14*

To 90 grams of a glue preparation of the type described in Example 7 are added drop by drop 42 grams of an oily impregnating medium as described in Example 8, 50 grams of a salt with a steeply rising solubility curve e. g. potassium nitrate. Shortly before gluing there are added 10 grams of a hot hardening solution as described in Example 1.

When there is added to the impregnating medium an oil-soluble dye and when gluing of for instance limba layers is carried out according to the above mentioned conditions e. g. when the plywood contains 20 kilograms of impregnating medium per cubic metre, pressing being carried out for 10 minutes at 100° C. and at 10 kilograms per sq. cm. then the penetration of the impregnating medium will be recognized by the colouration of the outer faces of the plywood. Penetration of the impregnating medium calculated on the surface area amounts to 60%.

We claim:

1. A process for producing shaped bodies by bonding porous construction elements together which comprises coating the mating surfaces of said elements with a bonding composition consisting essentially of an aqueous adhesive solution; a water-insoluble protective material dispersed in the adhesive solution, said protective material being selected from the group consisting of fungicidal agents, insecticidal agents and mixtures thereof; and a coagulant for said adhesive solution, said coagulant displacing the dispersed protective material into the pores of the construction elements at elevated temperature and pressure; and pressing the coated elements together at an elevated temperature and at superatmospheric pressure.

2. The process of claim 1 wherein the coagulant is a compound which is gasified at elevated temperatures.

3. The process of claim 1 wherein the coagulant is an electrolyte possessing a strongly temperature dependent solubility in water.

4. A bonding composition for bonding porous construction elements liable to attack by biologically destructive agencies, said composition consisting essentially of an aqueous adhesive solution, a dispersed water-insoluble protective material selected from the group consisting of fungicidal agents, insecticidal agents and mixtures thereof, and a coagulant for said adhesive solution, said coagulant having the property of displacing the dispersed protective material into the pores of said construction elements when bonding the same together by the application of heat and pressure.

5. The bonding composition of claim 4 wherein the coagulant is a compound which is gasified at elevated temperatures.

6. The bonding composition of claim 4 wherein the coagulant is an electrolyte possessing a strongly temperature dependent solubility in water.

7. The bonding composition of claim 4 wherein the coagulant is an organic amine.

8. The bonding composition of claim 4 wherein the coagulant is hydrazine hydrate.

9. The bonding composition of claim 4 wherein the coagulant is an alkyl naphthalene sulfonic acid amine.

10. A bonding composition for bonding porous construction elements liable to attack by biologically destructive agencies, said composition consisting essentially of an aqueous adhesive solution, a dispersed water-insoluble protective material selected from the group consisting of fungicidal agents, insecticidal agents and mixtures thereof, said protective material being present in a proportion of between about 0.5 to 50% by weight relative to the adhesive solution, and a coagulant for said adhesive solution, said coagulant being present in a proportion of between about 0.1 to 30% by weight relative to the total weight of the bonding composition, said coagulant having the property of displacing the dispersed protective material into the pores of said construction elements when bonding the same together by the application of heat and pressure.

References Cited in the file of this patent

UNITED STATES PATENTS

| | | |
|---|---|---|
| 2,495,175 | Nagel | Jan. 17, 1950 |
| 2,562,641 | Saunders | July 31, 1951 |

OTHER REFERENCES

"Chemistry of Insecticides, Fungicides and Herbicides," Frear, 2nd edition, September 1948, pages 280–282.